(12) United States Patent
Imafuji

(10) Patent No.: US 9,507,121 B2
(45) Date of Patent: Nov. 29, 2016

(54) INTERCHANGEABLE LENS

(71) Applicant: NIKON CORPORATION, Tokyo (JP)

(72) Inventor: Kazuharu Imafuji, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/202,297

(22) Filed: Mar. 10, 2014

(65) Prior Publication Data

US 2014/0184893 A1 Jul. 3, 2014

Related U.S. Application Data

(63) Continuation of application No. PCT/JP2012/073372, filed on Sep. 12, 2012.

(30) Foreign Application Priority Data

Sep. 12, 2011 (JP) ................. 2011-198422

(51) Int. Cl.
*G02B 7/14* (2006.01)
*H04N 5/232* (2006.01)
*G03B 17/14* (2006.01)

(52) U.S. Cl.
CPC ............... *G02B 7/14* (2013.01); *G03B 17/14* (2013.01); *H04N 5/232* (2013.01); *H04N 5/23209* (2013.01); *G03B 2206/00* (2013.01)

(58) Field of Classification Search
CPC ... H04N 5/23209; G03B 17/12; G03B 17/14
USPC .................... 348/360; 396/529–533
See application file for complete search history.

(56) References Cited

U.S. PATENT DOCUMENTS 4,841,322 A * 6/1989 Kawasaki .............. G03B 17/14
396/238
5,003,399 A 3/1991 Ishimaru et al.
(Continued)

FOREIGN PATENT DOCUMENTS

CN 102016679 A 4/2011
JP A-8-166614 6/1996
(Continued)

OTHER PUBLICATIONS

International Search Report issued in International Patent Application No. PCT/JP2012/073372 dated Dec. 18, 2012.
(Continued)

*Primary Examiner* — Christopher K Peterson
(74) *Attorney, Agent, or Firm* — Oliff PLC

(57) ABSTRACT

An interchangeable lens includes: an attachment section to which a camera body is to be attached; a photographic optical system that includes a plurality of driven members whose driven state changes; a driven information transmission unit that transmits a plurality of items of driven information to the camera body according to a clock signal outputted from the camera body, the plurality of items of driven information being related to positions of the plurality of driven members; and a type information transmission unit that transmits type information via a first transmission unit, the type information representing a type of driven information which can be transmitted by the driven information transmission unit; wherein the driven information transmission unit transmits the driven information for each of the plurality of driven members via a second transmission unit that is different from the first transmission unit.

15 Claims, 9 Drawing Sheets

(56) References Cited

U.S. PATENT DOCUMENTS

| | | |
|---|---|---|
| 5,771,407 A | 6/1998 | Imafuji et al. |
| 2006/0050170 A1* | 3/2006 | Tanaka .................. 348/360 |
| 2009/0245777 A1 | 10/2009 | Shibuno et al. |
| 2011/0317990 A1 | 12/2011 | Imafuji |
| 2012/0014259 A1* | 1/2012 | Nogami .................. 370/241 |

FOREIGN PATENT DOCUMENTS

| | | | |
|---|---|---|---|
| JP | A-10-68871 | 3/1998 | |
| JP | A-2007-322922 | 12/2007 | |
| JP | A-2010-160174 | 7/2010 | |
| JP | WO2010/109752 * | 9/2010 | ............. H04L 29/08 |
| JP | A-2010-237514 | 10/2010 | |
| JP | A-2011-112700 | 6/2011 | |
| JP | A-2012-32761 | 2/2012 | |
| JP | 5447364 B2 | 3/2014 | |

OTHER PUBLICATIONS

May 3, 2016 Office Action issued in Chinese Application No. 201280044179.X.

* cited by examiner

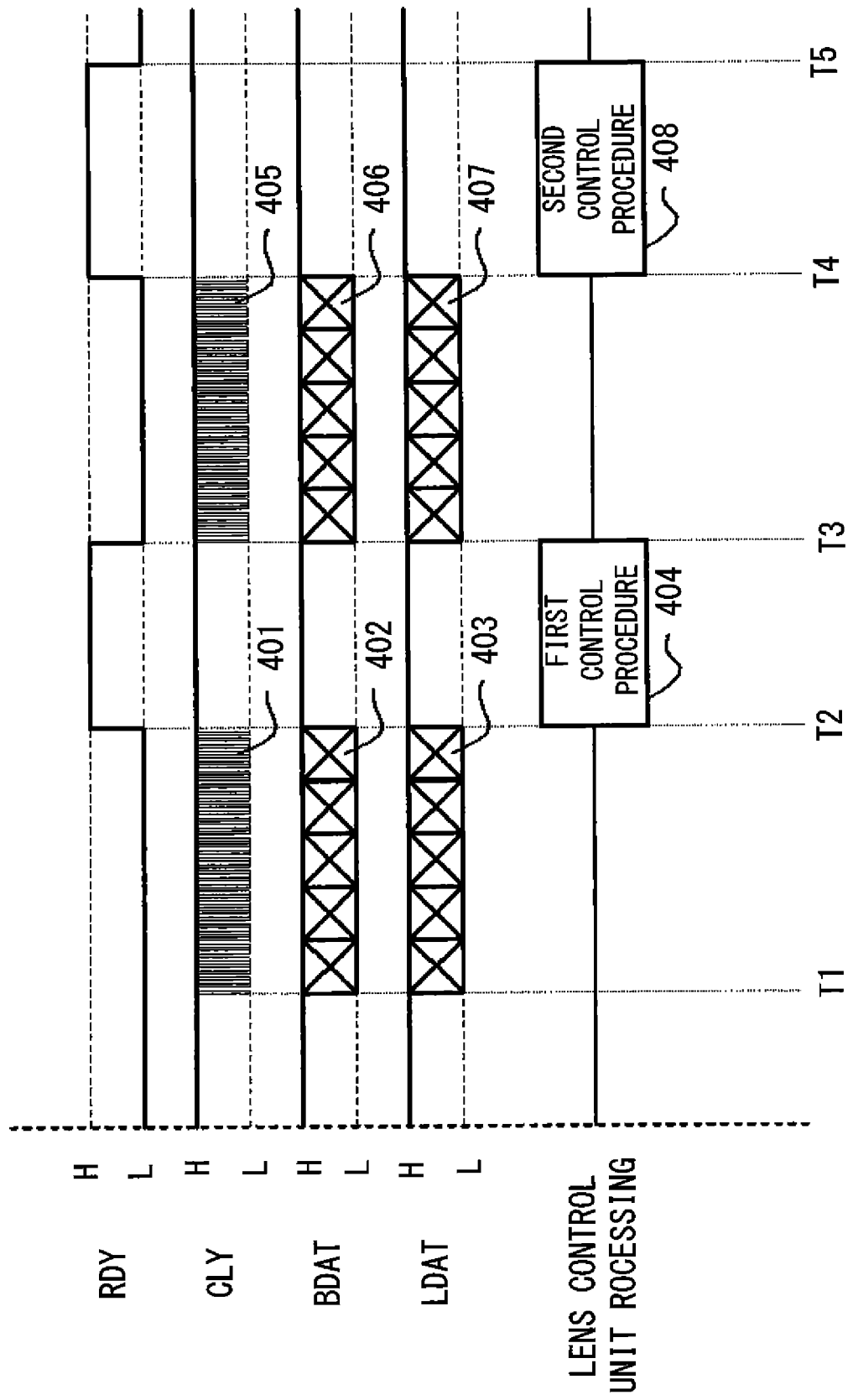

INTERCHANGEABLE LENS

INCORPORATION BY REFERENCE

This application is a continuation of International Application No. PCT/JP2012/073372 filed Sep. 12, 2012.

The disclosures of the following priority applications are herein incorporated by references:

Japanese Patent Application No. 2011-198422 filed Sep. 12, 2011.

International Application No. PCT/JP2012/073372 filed Sep. 12, 2012.

BACKGROUND OF THE INVENTION

1. Field of the Invention

The present invention relates to an interchangeable lens.

2. Description of Related Art

Generally, at least one optical member whose driven state changes, such as a lens for focus adjustment or the like, is disposed within the interchangeable lens of a camera system in which the lens can be interchanged. The camera body needs information related to the driven state of this type of driven member ("driven information") for various types of control. For example, in the camera system described in Japanese Laid-Open Patent Publication H10-68871, an encoder that monitors the movement of a lens transport system is provided. A drive amount monitor signal outputted by this encoder is fed back to a lens drive control CPU via lens side contact points that are provided to the lens mount unit and via body side contact points corresponding thereto that are provided to a mount unit upon the body. Moreover, with the camera system described in Japanese Laid-Open Patent Publication H10-68871, a main CPU within the camera body is coupled to a lens CPU or the like within the photographic lens via contact points other than those that transmit the monitor signal described above. The main CPU receives information needed for controlling the camera sequence and exposure operation from the other CPU or the like, and sends information about the required camera sequence to the other CPU. In other words, these contact points are contact points for general purpose communication performed between the main CPU and the lens CPU.

SUMMARY OF INVENTION

When performing transmission and reception of driven information using the above described contact points for general purpose communication, there has been the problem that the camera body is not able to recognize in advance what type of driven information the interchangeable lens is capable of transmitting.

According to the 1st aspect of the present invention, an interchangeable lens, comprises: an attachment section to which a camera body is to be attached; a photographic optical system that includes a plurality of driven members whose driven state changes; a driven information transmission unit that transmits a plurality of items of driven information to the camera body according to a clock signal outputted from the camera body, the plurality of items of driven information being related to positions of the plurality of driven members; and a type information transmission unit that transmits type information via a first transmission unit, the type information representing a type of driven information which can be transmitted by the driven information transmission unit; wherein the driven information transmission unit transmits the driven information for each of the plurality of driven members via a second transmission unit that is different from the first transmission unit.

According to the 2nd aspect of the present invention, the interchangeable lens according to the 1st aspect may further comprise a specification information reception unit that receives specification information from the camera body via the first transmission unit, the specification information specifying the type of the driven information wherein, if the specification information reception unit does not succeed in receiving the specification information, the driven information transmission unit transmits the driven information of all the types that can be transmitted.

According to the 3rd aspect of the present invention, it is preferred that in the interchangeable lens according to the 1st aspect, the driven member is one of a focusing lens that performs focus adjustment of the photographic optical system, a blurring correction lens that corrects image blurring of an image of a photographic subject, and an iris aperture that adjusts an amount of light from the photographic subject that passes through the photographic optical system.

According to the 4th aspect of the present invention, an interchangeable lens, comprises: an attachment section to which a camera body is to be attached; a photographic optical system that includes a plurality of driven members whose driven state changes; a driven information transmission unit that transmits a plurality of items of driven information to the camera body according to a clock signal outputted from the camera body, the plurality of items of driven information being related to positions of the plurality of driven members; a type information transmission unit that transmits type information via a first transmission unit, the type information representing a type of driven information that can be transmitted by the driven information transmission unit; and a specification information reception unit that receives specification information from the camera body via the first transmission unit, the specification information specifying the type of the driven information; wherein the driven information transmission unit, without any relationship with the specification information, transmits the driven information for each of the plurality of driven members via a second transmission unit that is different from the first transmission unit.

According to the 5th aspect of the present invention, it is preferred that in the interchangeable lens according to the 4th aspect may further comprise: a specification information reception unit that receives the specification information from the camera body via the first transmission unit, the specification information specifying the type of the driven information wherein, if the specification information reception unit does not succeed in receiving the specification information, the driven information transmission unit transmits the driven information of all the types that can be transmitted.

According to the present invention, it is possible to ascertain the type of the drive reception information that is transmitted from the interchangeable lens.

BRIEF DESCRIPTION OF DRAWINGS

FIG. 4 is a timing chart showing an example of command data communication;

DESCRIPTION OF PREFERRED EMBODIMENTS

Embodiment #1

Figure 1:
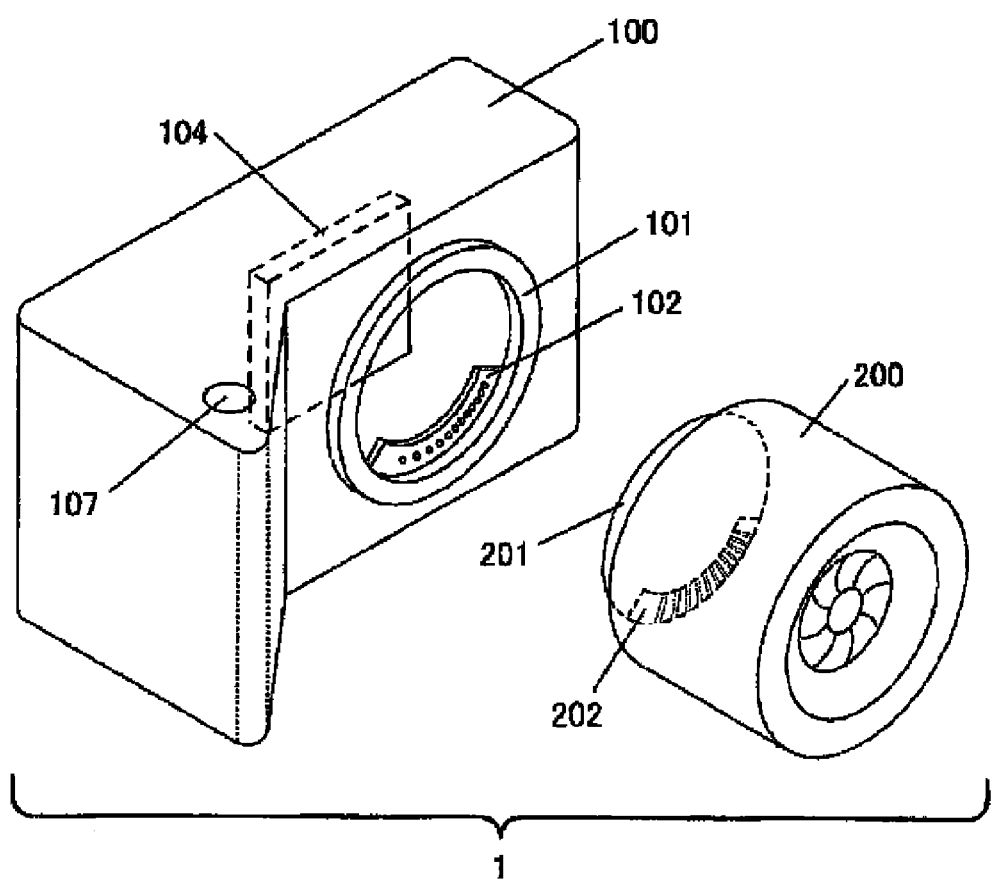
FIG. 1 is a perspective view showing a camera system of an interchangeable lens type to which the present invention has been applied.

FIG. 1 is a perspective view showing an interchangeable lens type camera system to which the present invention has been applied. It should be understood that only devices and apparatus related to the present invention are shown in FIG. 1, while other devices and apparatus are not shown in the figures and explanation thereof is omitted. This camera system 1 comprises a camera body 100 and an interchangeable lens 200 that can be fitted to or detached from the camera body 100.

The camera body 100 is provided with a body side mount unit 101, to which the interchangeable lens 200 is detachably attached. A body side support unit (i.e. an electrical connection unit) 102 that supports twelve body side connection terminals is provided in a position in the neighborhood of this body side mount unit 101 (circumferentially internal to the body side mount unit 101), and in a state of partially projecting radially inwards of the body side mount unit 101.

Moreover, the interchangeable lens 200 is provided with a lens side mount unit 201 that corresponds to the body side mount unit 201 and to which the camera body 100 can be detachably attached. And a lens side support unit (i.e. an electrical connection unit) 202 that supports twelve lens side connection terminals is provided in a position in the neighborhood of this lens side mount unit 201 (circumferentially internal to the lens side mount unit 201), and in a state of partially projecting radially inwards of the lens side mount unit 201.

When the interchangeable lens 200 is installed to the camera body 100, the body side support unit 102 (this will be described in detail hereinafter) that is provided with the plurality of body side connection terminals is electrically and also physically connected to the lens side support unit 202 (this also will be described in detail hereinafter) that is provided with the plurality of lens side connection terminals. These terminals are used for supplying electrical power to the interchangeable lens 200 from the camera body 100, and for transmission and reception of signals between the camera body 100 and the interchangeable lens 200.

An imaging element 104 is provided behind the body side mount unit 101 within the camera body 100. And a button 107, i.e. an input device, is provided at the top of the camera body 100. The user issues commands for photography and commands for setting photographic conditions and so on to the camera body 100 by using input devices such as the button 107 and so on.

Figure 2:
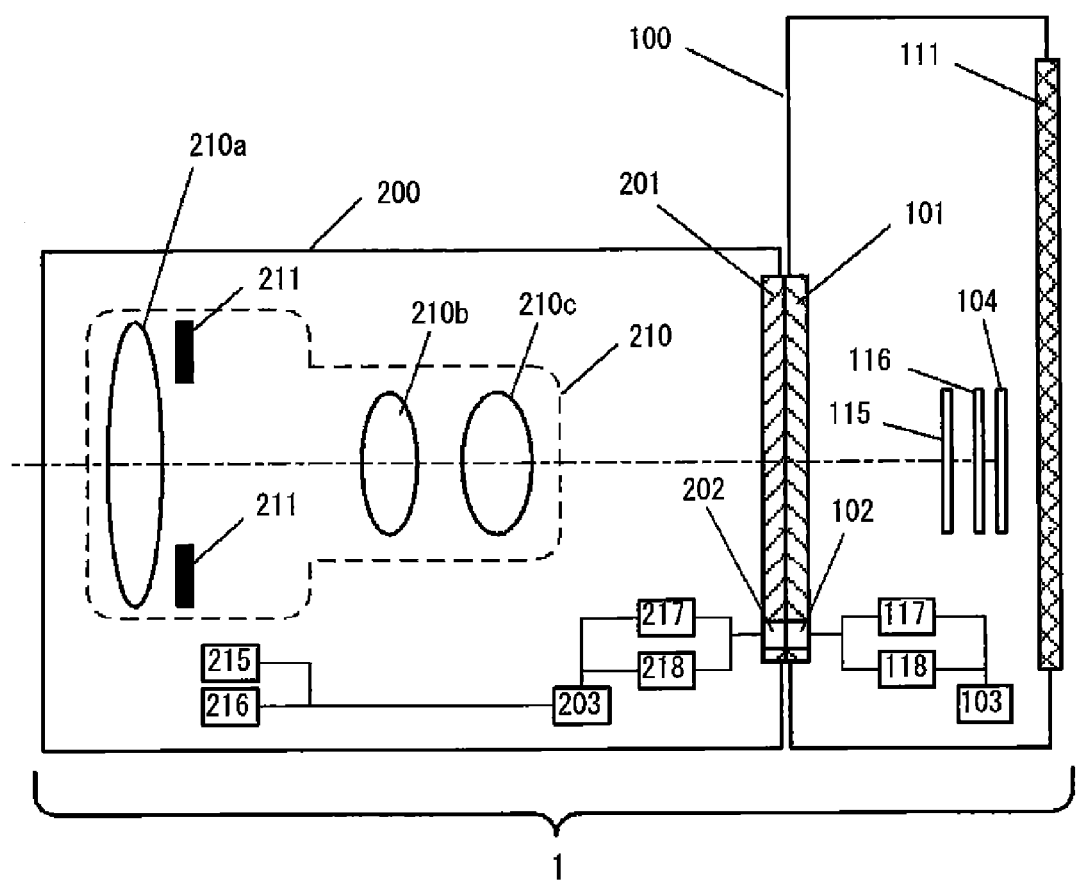
FIG. 2 is a sectional view showing this camera system of the interchangeable lens type to which the present invention has been applied.

FIG. 2 is a sectional view showing the camera system of the interchangeable lens type to which the present invention has been applied. The interchangeable lens 200 comprises a focusing optical system 210 that focuses an image of the photographic subject. This focusing optical system 210 comprises a plurality of lenses 210a through 210c and an iris diaphragm 211. This plurality of lenses 210a through 210c includes a focusing lens 210b for controlling the focused position of the image of the photographic subject, and a blurring correction lens 210c that corrects blurring of the image of the photographic subject.

Drive systems (not shown in the figures) are installed in the interior of the interchangeable lens 200, for driving each of the focusing lens 210b, the blurring correction lens 210c, and the iris diaphragm 211. For example, the focusing lens 210b is driven by an ultrasonic motor. Moreover, the blurring correction lens 210c is driven by two voice coil motors, and the iris diaphragm 211 is driven by a stepping motor. In other words, the focusing lens 210b, the blurring correction lens 210c, and the iris diaphragm 211 are driven members (optical members) that are driven by drive systems that are provided internally to the interchangeable lens 200, and whose driven states are changed thereby. In this manner, the driven members (optical members) of the present invention include, not only those of the lenses 210a through 210c that can be driven, but also members that are present upon the photographic optical path and that either pass or block the light flux from the photographic subject. For example, the iris diaphragm 211 that regulates the amount of light from the photographic subject that passes through the focusing optical system 210 is also one of the driven members (optical members).

A lens control unit 203 is also provided internally to the interchangeable lens 200, and supervises control of the various sections of the interchangeable lens 200. This lens control unit 203 comprises a microcomputer not shown in the figures and peripheral circuitry thereof. The lens control unit 203 is connected to a first lens side communication unit 217, a second lens side communication unit 218, a ROM 215, and a RAM 216.

The first lens side communication unit 217 and the second lens side communication unit 218 perform transfer of data to and from the camera body 100 via the terminals of the lens side support unit 202 and of the body side support unit 102. Each of the first lens side communication unit 217 and the second lens side communication unit 218 is a communication interface on the interchangeable lens side. The lens control unit 203 uses these communication interfaces to perform various types of communication to be described hereinafter (hot line communication and command data communication) with the camera body 100 (i.e. with a body control unit 103 that will be described hereinafter).

The ROM 215 is a non-volatile storage medium which stores a predetermined control program for execution by the lens control unit 203 and so on. And the RAM 216 is a volatile storage medium that is used by the lens control unit 203 as a storage region for storing data of various types.

A shutter 115 for controlling the exposure state of the imaging element 104 and an optical filter 116 that is a combination of an optical low pass filter and an infrared radiation cutoff filter are provided at the front surface of the imaging element 104. Light from the photographic subject that has passed through the focusing optical system 210 is incident upon the imaging element 104 via the shutter 115 and the filter 116.

A body control unit 103 is provided in the interior of the camera body 100, and supervises control of various sections of the camera body 100. This body control unit 103 comprises a microcomputer, RAM, and peripheral circuitry not shown in the figures.

A first body side communication unit 117 and a second body side communication unit 118 are connected to the body control unit 103. The first body side communication unit 117 is connected to the body side support unit 102, and is capable of performing interchange of data with the first lens side communication unit 217. In a similar manner, the second body side communication unit 118 is capable of performing interchange of data with the second lens side communication unit 219. To put it in another manner, each of the first body side communication unit 117 and the second body side communication unit 118 is a body side communication interface. The body control unit 103 uses these communication interfaces for performing various forms of communication (hot line communication and command data communication) with the interchangeable lens 200 (i.e. with the lens control unit 203), as will be described hereinafter.

A display device 111 that comprises an LCD panel and so on is disposed upon the rear surface of the camera body 100. The body control unit 103 displays an image of the photographic subject upon this display device 111 based upon the output of the imaging element 104 (i.e. a so called live view image), and also various types of menu screen for setting photographic conditions and so on.

Explanation of the body side support unit 102 and the lens side support unit 202.

Figure 3:
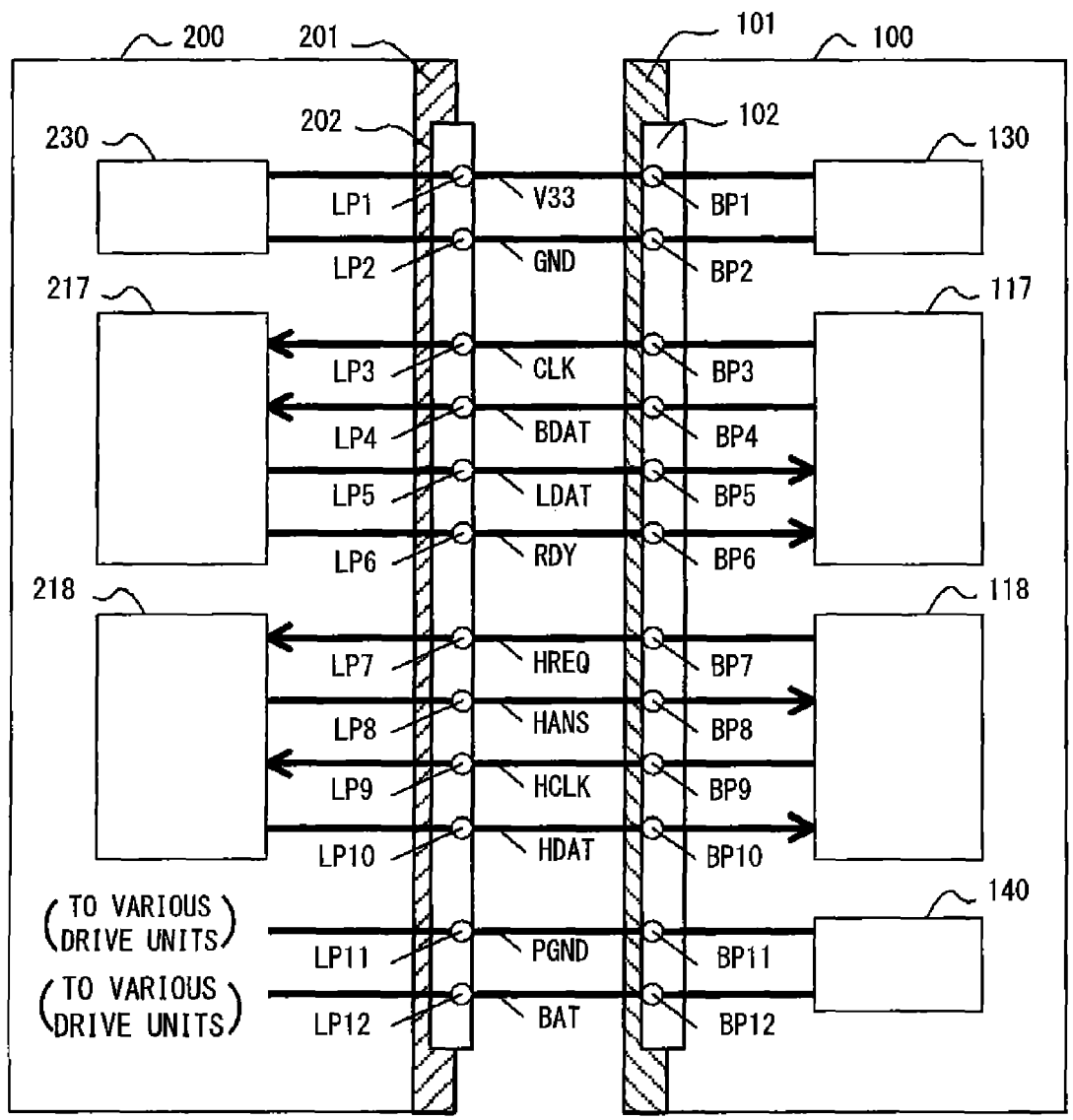
FIG. 3 is a schematic figure showing the details of support units 102 and 202.

FIG. 3 is a schematic figure showing the details of the body side support unit 102 and the lens side support unit 202. It should be understood that the fact that, in FIG. 3, the body side support unit 102 is disposed on the right side of the body side mount unit 101, is copied from the actual mount construction. In other words, the body side support unit 102 of this embodiment is disposed in a location in which it is deeper inward than the mounting surface of the body side mount unit 101 (i.e. in a position more to the right side in FIG. 3 than the body side mount unit 101). In a similar manner, the fact that the lens side support unit 202 of this embodiment is disposed on the right side of the lens side mount unit 201 of the interchangeable lens 200 means that the lens side support unit 202 is disposed in a position in which it projects more than the mounting surface of the lens side mount unit 201. The mounting surface of the body side mount unit 101 and the mounting surface of the lens side mount unit 201 are in mutual contact, and thereby the camera body 100 and the interchangeable lens 200 are coupled together by the mounting process. Since the body side support unit 102 and the lens side support unit 202 are arranged as described above, accordingly the body side support unit 102 and the lens side support unit 202 are connected together by the above mounting coupling, and thus the electrical contact points that are provided to these two support units are also mutually connected together. Since this type of mount construction is per se known, further explanation thereof and further illustration in the drawings are omitted.

As shown in FIG. 3, twelve contact points BP1 through BP12 are provided in the body side support unit 102. Moreover, twelve contact points LP1 through LP12 corresponding to the above described twelve contact points respectively are provided in the lens side support unit 202.

The contact point BP1 and the contact point BP2 are connected to an electrical power supply unit 130 within the camera body 100. The electrical power supply unit 130 supplies operating voltage to the contact point BP1 for use by various sections within the interchangeable lens 200, with the exception of certain circuits that incorporate drive systems such as actuators and so on and whose consumption of electrical power is comparatively large (i.e. the drive system for the focusing lens 210b and so on). In other words, operating voltage for various sections within the interchangeable lens 200, with the exception of the drive units described above, is supplied from the contact point BP1 and the contact point LP1. The value of the voltage that can be supplied to this contact point BP1 has a range from a minimum voltage value to a maximum voltage value (for example a range of about 3V), but the voltage value that is supplied as standard is a voltage value in the neighborhood of an intermediate value between this maximum voltage value and this minimum voltage value. And due to this, in the power supply ON state, the value of the current that is supplied from the camera body 100 side to the interchangeable lens 200 side is within a range from around several tens of milliamperes to several hundreds of milliamperes.

The contact point BP2 is a ground terminal corresponding to the above described operating voltage that is supplied to the contact point BP1. In other words, the contact point BP2 and the contact point LP2 are at a ground terminal voltage corresponding to the operating voltage described above. The contact point LP1 and the contact point LP2 are connected to an electrical power reception unit 230 within the interchangeable lens 200. This power reception unit 230 supplies the electrical power provided from the camera body 1 to various sections within the interchangeable lens 200, including the lens control unit 203.

In the following explanation, the signal line constituted by the contact point BP1 and the contact point LP1 will be termed the signal line V33. Moreover, the signal line constituted by the contact point BP2 and the contact point LP2 will be termed the signal line GND. These contact points LP1, LP2, BP1, and BP2 constitute a set of power supply system contact points for supplying electrical power from the camera body 100 side to the interchangeable lens 200 side.

The contact points BP3, BP4, BP5, and BP6 are connected to the first body side communication unit 117. And the contact points LP3, LP4, LP5, and LP6 on the interchangeable lens 200 side that correspond to the above contact points are connected to the first lens side communication unit 217. The first body side communication unit 117 and the first lens side communication unit 217 perform mutual transmission and reception of data by using these contact points (that are communication system contact points). The details of this communication performed by the first body side communication unit 117 and the first lens side communication unit 217 will be explained hereinafter.

It should be understood that, in the following explanation, the signal line constituted by the contact point BP3 and the contact point LP3 will be termed the signal line CLK. Moreover, in a similar manner, the signal line constituted by the contact point BP4 and the contact point LP4 will be termed the signal line BDAT, the signal line constituted by the contact point BP5 and the contact point LP5 will be termed the signal line LDAT, and the signal line constituted by the contact point BP6 and the contact point LP6 will be termed the signal line RDY.

The contact points BP7, BP8, BP9, and BP10 are connected to the second body side communication unit 118. And the contact points LP7, LP8, LP9, and LP10 on the interchangeable lens 200 side that correspond to the above contact points are connected to the second lens side communication unit 218. The second lens side communication unit 218 performs transmission of data to the second body side communication unit 118 by using these contact points (i.e. communication system contact points). The details of this communication performed by the second body side communication unit 118 and the second lens side communication unit 218 will be explained hereinafter.

It should be understood that, in the following explanation, the signal line constituted by the contact point BP7 and the contact point LP7 will be termed the signal line HREQ. Moreover, in a similar manner, the signal line constituted by the contact point BP8 and the contact point LP8 will be termed the signal line HANS, the signal line constituted by the contact point BP9 and the contact point LP9 will be termed the signal line HCLK, and the signal line constituted by the contact point BP10 and the contact point LP10 will be termed the signal line HDAT.

The contact point BP11 and the contact point BP12 are connected to a power supply circuit 140 within the camera body 100. This power supply circuit 140 supplies drive voltage to the contact point BP12 for various sections that incorporate drive systems such as actuators and so on, and whose consumption of electrical power is comparatively large (i.e. the drive system for the focusing lens 210b and so on). In other words, drive voltage for the drive system for the focusing lens 210b and so on is supplied from the contact point BP12 and the contact point LP12 . The value of the voltage that can be supplied to this contact point BP12 has a range from a minimum voltage value to a maximum voltage value, but all of this range covers higher voltage values than the voltage value range that can be supplied to the contact point BP1 as previously described (for example, the maximum voltage value that can be supplied to the contact point BP12 may be around several times the maximum voltage value that can be supplied to the contact point BP1). In other words, the voltage value that is supplied to the contact point BP12 and the voltage value that is supplied to the above described contact point BP1 are voltage values of different magnitudes. It should be understood that the voltage value that is supplied as standard to the contact point BP12 is a voltage value in the neighborhood of an intermediate value between the maximum voltage value and the minimum voltage value that can be supplied to the contact point BP12. And, due to this, in the power supply ON state, the value of the current that is supplied from the camera body 100 side to the interchangeable lens 200 side is within a range from around several tens of milliamperes to several amperes.

The contact point BP11 is a ground terminal corresponding to the above described operating voltage that is supplied to the contact point BP12. In other words, the contact point BP11 and the contact point LP11 are ground terminals corresponding to the operating voltage described above.

In the following explanation, the signal line constituted by the contact point BP11 and the contact point LP11 will be termed the signal line PGND. Moreover, the signal line constituted by the contact point BP12 and the contact point LP12 will be termed the signal line BAT. These contact points LP11, LP12, BP11, and BP12 constitute a set of power supply system contact points for supplying electrical power from the camera body 100 side to the interchangeable lens 200 side.

It should be understood that the following points are clear from the magnitude relationship between the voltage value (the current value) supplied to the contact point BP12 and the contact point LP12, and the voltage value (the current value) supplied to the contact points BP1 and LP1. That is, the difference between the maximum value and the minimum value of the current flowing to the contact point BP11 and the contact point LP11 that constitute the ground terminal with respect to the voltage supplied to each of the contact points BP12 and LP12 is greater than the difference between the maximum value and the minimum value of the current flowing to the contact point BP2 and the contact point LP2. This is due to the fact that the electrical power consumed by the drive units that incorporate drive systems such as actuators and so on is large as compared to the power consumed by the electronic circuitry within the interchangeable lens 200 such as the lens control unit 203 and so on, and is also due to the fact that there is no consumption of electrical power by the drive units when driving of the driven members is not required.

Explanation of Command Data Communication

The lens control unit 203 controls the first lens side communication unit 217, and performs reception of control data from the first body side communication unit 117 and transmission of response data to the first body side communication unit 117 in parallel at the first predetermined cycle (in this embodiment, for example, every 16 milliseconds) via the contact points LP3 through LP6, in other words via the signal lines CLK, BDAT, LDAT, and RDY. In the following, the details of this communication between the first lens side communication unit 217 and the first body side communication unit 117 will be explained in detail.

It should be understood that, in this embodiment, the communication that is performed between the lens control unit 203 and the first lens side communication unit 217, and the body control unit 103 and the first body side communication unit 117, will be termed "command data communication". Moreover, the transmission path consisting of the four signal lines used for this command data communication (i.e. the signal lines CLK, BDAT, LDAT, and RDY) will be termed the "first transmission path".

FIG. 4 is a timing chart showing an example of this command data communication. When command data communication starts (at T1), the body control unit 103 and the first body side communication unit 117 check the signal level on the signal line RDY. The signal level on the signal line RDY specifies whether or not communication with the first lens side communication unit 217 is possible. In other words, a communication possible/impossible signal that specifies whether or not communication is possible is outputted from the first lens side communication unit 217 upon the signal line RDY. If the situation is that communication is not possible, then the lens control unit 203 and the first lens side communication unit 217 output a signal at H (high) level from the contact point LP6. In other words, the signal level of the signal line RDY is brought to H level. If the signal line RDY is at H level, then the body control unit 103 and the first body side communication unit 117 do not start communication until this signal line goes to L level. Moreover, the subsequent processing is not executed during communication.

If the signal line RDY is at L (low) level, then the body control unit 103 and the first body side communication unit 117 output a clock signal 401 from the contact point BP3. In other words, the clock signal 401 is transmitted to the first lens side communication unit 217 via the signal line CLK. In synchronization with this clock signal 401, the body control unit 103 and the first body side communication unit 117 then output from the contact point BP4 a body side command packet signal 402, this being the front half portion of control data. In other words, the body side command packet signal 402 is transmitted to the first lens side communication unit 217 via the signal line BDAT.

Moreover, when the clock signal is outputted on the signal line CLK, then, in synchronization with the clock signal 401, the lens control unit 203 and the first lens side communication unit 217 output from the contact point LP5 a lens side command packet signal 403, this being the front half portion of response data. In other words, the lens side command packet signal 403 is transmitted to the first body side communication unit 117 via the signal line LDAT.

In response to completion of transmission of the lens side command packet signal 403, the lens control unit 203 and the first lens side communication unit 217 bring the signal level on the signal line RDY to H level (at T2). And the lens control unit 203 starts a first control procedure 404 (to be described hereinafter), this being processing in response to reception of the contents of the body side command packet signal 402.

When the first control procedure 404 has been completed, the lens control unit 203 notifies the first lens side communication unit 217 of the completion of this first control procedure 404. And, in response to this notification, the first lens side communication unit 217 outputs a signal at L level from the contact point LP6. In other word, it brings the signal level on the signal line RDY to L level (at T3). And, in response to this change of signal level, the body control unit 103 and the first body side communication unit 117 output a clock signal 405 from the contact point BP3. In other words, the clock signal 405 is transmitted to the first lens side communication unit 217 via the signal line CLK.

In synchronization with this clock signal 405, the body control unit 103 and the first body side communication unit 117 output from the contact point BP4 a body side data packet signal 406, this being the rear half portion of control data. In other words, the body side data packet signal 406 is transmitted to the first lens side communication unit 217 via the signal line BDAT.

Moreover, when the clock signal 405 is outputted upon the signal line CLK, the lens control unit 203 and the first lens side communication unit 217, in synchronization with this clock signal 405, output from the contact point LP5 a lens side data packet signal 407, this being the rear half portion of the response data. In other words, the lens side data packet signal 407 is transmitted to the first body side communication unit 117 via the signal line LDAT.

In response to completion of transmission of the lens side data packet signal 407, the lens control unit 203 and the first lens side communication unit 217 bring the signal level upon the signal line RDY to H level for a second time (at T4). And the lens control unit 203 starts a second control procedure 408 (to be described hereinafter), this being processing corresponding to the contents of the body side data packet signal 406 that has been received.

As described above, the first lens side communication unit 217 performs data communication with the camera body 100 by using the signal line CLK upon which the clock signal from the camera body is outputted, the signal line BDAT upon which a data signal is outputted in synchronization with the clock signal from the camera body 100, the signal line LDAT upon which a data signal is outputted in synchronization with the clock signal from the first lens side communication unit 217, and the signal line RDY upon which the communication possible/impossible signal is outputted from the first lens side communication unit 217 specifying whether or not data communication with the first lens side communication unit 217 is possible.

Now, the first control procedure 404 and the second control procedure 408 performed by the lens control unit 203 will be described.

As an example, the case will now be described in which the contents of the body side command packet signal 402 is a request for specific data regarding the interchangeable lens side. As the first control procedure 404, along with executing analysis processing upon the contents of the command packet signal 402, the lens control unit 203 also executes processing to generate the data specified by that request. Moreover, as the first control procedure 404, using checksum data included in the command packet signal 402, the lens control unit 203 also executes communication error checking processing in order to check in a simple manner from the number of data bytes whether or not there is no error in communication of the command packet signal 402. And a signal containing the specified data and generated by this first control procedure 404 is outputted to the body side as the lens side data packet signal 407. It should be understood that, in this case, the body side data packet signal 406 outputted from the body side after the command packet signal 402 is a dummy data signal (including checksum data) that has no meaning in particular for the lens side. In this case, in the second control procedure 408, the lens control unit 203 performs communication error checking processing like that described above, using the checksum data included in the body side data packet signal 406.

Next, as an example, the case will now be described in which the body side command packet signal 402 is a command to drive a driven member on the lens side. Moreover, as an example, the case will be described in which the command packet signal 402 is a drive command for the focusing lens 210b, and the received body side data packet signal 406 is a drive amount for the focusing lens 210b. As the first control procedure 404, along with performing analysis processing upon the contents of the command packet signal 402, the lens control unit 203 also generates an acknowledgement signal specifying that those contents have been understood. Moreover, as the first control procedure 404, using checksum data included in the command packet signal 402, the lens control unit 203 also performs communication error checking processing similar to that described above. An acknowledgement signal generated by this first control procedure 404 is outputted to the body side as the lens side data packet signal 407. Furthermore, in the second control procedure 408, along with executing analysis processing upon the contents of the body side data packet signal 406, the lens control unit 203 also performs communication error checking processing like that described above using the checksum data included in the body side data packet signal 406.

When the second control procedure 408 has been completed, the lens control unit 203 notifies the first lens side communication unit 217 of this completion of the second control procedure 408. Due to this, the lens control unit 203 outputs an L level signal to the first lens side communication unit 217 from the contact point LP6. In other words, it brings the signal level of the signal line RDY to L level (at T5).

It should be understood that, if as described above the body side command packet signal 402 that has been received is a command to drive a lens side driven member (for example the focusing lens), then the lens control unit 203 executes processing like the following. That is, the lens control unit 203 executes processing to drive the focusing lens 210b with the drive system for the focusing lens 210b by just that drive amount, while making the first lens side communication unit 217 keep the signal level of the signal line RDY at L level.

The communication that has been performed as described above between the time instants T1 and T5 constitutes a single processing of command data communication. As described above, in this single processing of command data communication, one each of the body side command packet signal 402 and the body side data packet signal 406 are transmitted by the body control unit 103 and the first body side communication unit 117 respectively. In other words, the body side command packet signal 402 and the body side data packet signal 406 together constitute one item of control data, although for the convenience of processing this single data item is divided into two parts and these two parts are transmitted separately.

In a similar manner, in a single processing of command data communication, one each of the lens side command packet signal 403 and the lens side data packet signal 407 are transmitted by the lens control unit 203 and by the first lens side communication unit 217 respectively. In other words, the lens side command packet signal 403 and the lens side data packet signal 407 together constitute one item of response data.

As described above, the lens control unit 203 and the first lens side communication unit 217 perform reception of control data from the first body side communication unit 117 and transmission of response data to the first body side communication unit 117 in parallel. The contact point LP6 and the contact point BP6 that are employed for this command data communication are contact points via which an asynchronous signal that is not synchronized with any other clock signal is transmitted (the H (high) level or L (low) signal level of the signal line RDY).

Explanation of Hot Line Communication

The lens control unit 203 controls the second lens side communication unit 218, and transmits lens position data to the second body side communication unit 118 via the contact points LP7 through LP10, in other words via the signal lines HREQ, HANS, HCLK, and HDAT. In the following, the details of this communication performed between the second lens side communication unit 218 and the second body side communication unit 118 will be explained.

It should be understood that, in this embodiment, the communication that is performed between the lens control unit 203 and the second lens side communication unit 218, and the communication that is performed between the body control unit 103 and the second body side communication unit 118, is termed "hot line communication". Moreover, the transmission path consisting of four signal lines that is employed for this hot line communication (i.e. consisting of the signal lines HREQ, HANS, HCLK, and HDAT) is termed the "second transmission path".

Figure 5A:
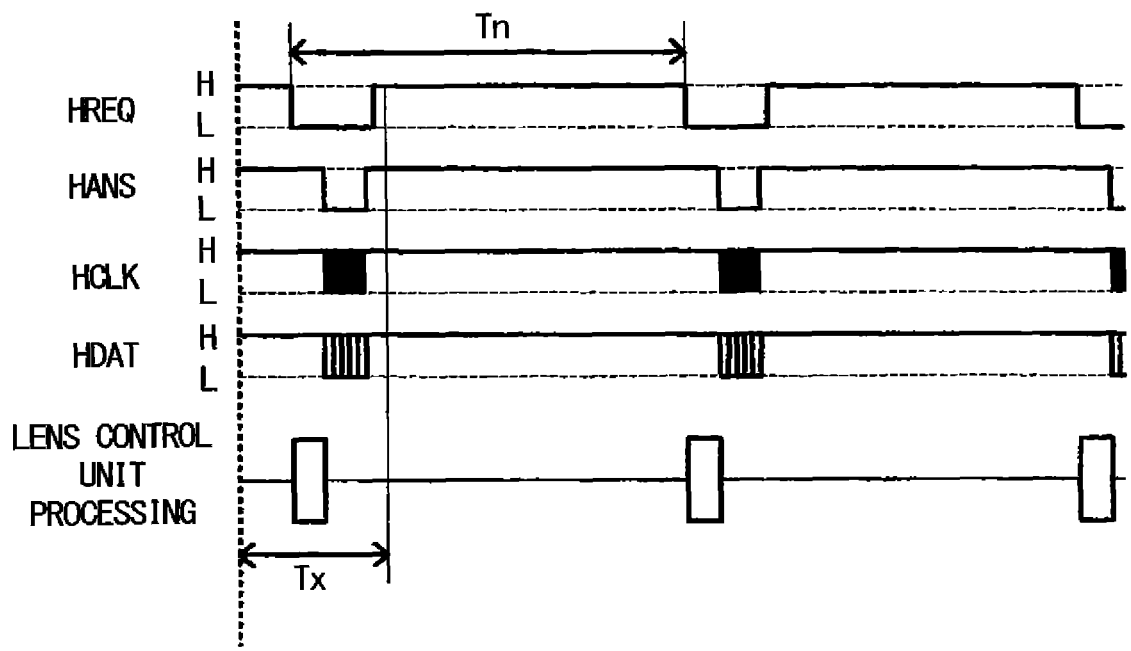
FIGS. 5A and 5B are timing charts showing an example of hot line communication, with FIG. 5A showing the situation when hot line communication is repeatedly executed with a predetermined period Tn and FIG. 5B showing a situation when the scale of an interval Tx during one communication episode of this repeatedly executed hot line communication is increased.
Figure 5B:
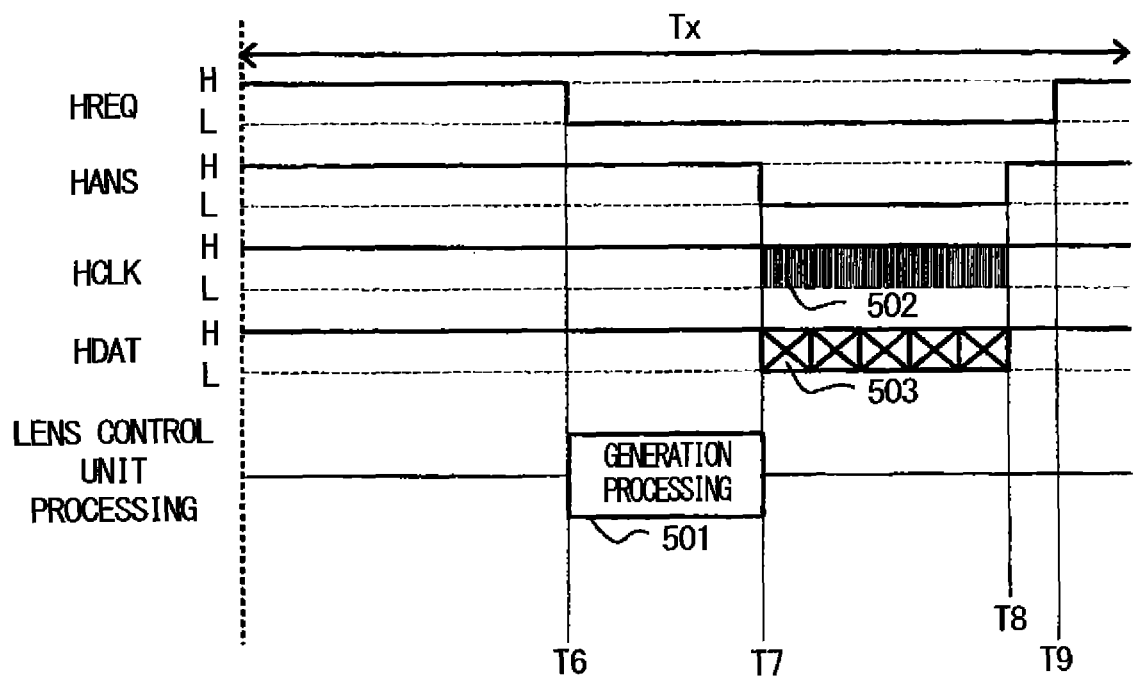

FIGS. 5A and 5B are timing charts showing an example of this hot line communication. The body control unit 103 of this embodiment is configured to start hot line communication upon a second predetermined cycle (in this embodiment, this may for example be each one millisecond). This cycle is shorter than the cycle at which the command data communication is performed. FIG. 5A is a figure showing the situation when hot line communication is repeatedly executed with a predetermined period Tn. And the situation when the scale of an interval Tx during one communication episode of this repeatedly executed hot line communication is increased is shown in FIG. 5B. In the following, the hot line communication procedure will be explained on the basis of the timing chart of FIG. 5B.

When hot line communication starts (at T6), the body control unit 103 and the second body side communication unit 118 output an L level signal from the first contact point BP7. In other words, the signal level of the signal line HREQ is brought to L level. And the second lens side communication unit 218 notifies the lens control unit 203 of the fact that this signal has been inputted to the contact point LP7. In response to this notification, the lens control unit 203 starts execution of generation processing 501 to generate lens position data. This generation processing 501 is processing for the lens control unit 203 to detect the position of the focusing lens 210b with a focusing lens position detection unit not shown in the figures, and to generate lens position data specifying the result of this detection.

When the lens control unit 203 has completed execution of this generation processing 501, the lens control unit 203 and the second lens side communication unit 218 output a signal at L level from the contact point LP8 (at T7). In other words, the signal level on the signal line HANS is brought to L level. And, in response to this signal inputted to the contact point BP8, the body control unit 103 and the second body side communication unit 118 output a clock signal 502 from the contact point BP9. In other words, a clock signal is transmitted to the second lens side communication unit 218 via the signal line HCLK.

In synchronization with this clock signal 502, the lens control unit 203 and the second lens side communication unit 218 output a lens position data signal 503 specifying the lens position data from the contact point LP10. In other words, the lens position data signal 503 is transmitted to the second body side communication unit 118 via the signal line HDAT.

When this transmission of the lens position data signal 503 has been completed, the lens control unit 203 and the second lens side communication unit 218 output a signal at H level from the contact point LP8. In other words, the signal level of the signal line HANS is brought to H level (at T8). And, in response to the input of this signal at the contact point BP8, the second body side communication unit 118 outputs a signal at H level from the contact point LP7. In other words, the signal level of the signal line HREQ is brought to H level (at T9).

The communication performed in the interval from the time instant T6 described above to T9 is one processing of the hot line communication. As described above, in one processing of hot line communication, one lens position data signal 503 is transmitted by the lens control unit 203 and the second lens side communication unit 218. The contact points LP7, LP8, BP7, and BP8 that are employed for this hot line communication are contact points via which asynchronous signals are transmitted that are not synchronized with other clock signals. That is, the contact points LP7 and BP7 are contact points via which an asynchronous signal (H (high)

level or L (low) level of the signal level on the signal line HREQ) is transmitted. Moreover, the contact points LP8 and BP8 are contact points via which an asynchronous signal (H (high) level or L (low) level of the signal level on the signal line HANS) is transmitted.

It should be understood that command data communication and hot line communication can also be executed either simultaneously or partially in parallel. In other words, either one of the lens side communication unit 217 and the second lens side communication unit 218 can perform communication with the camera body 100, even if the other one thereof is also performing communication with the camera body 100.

Explanation of the Driven Information

The interchangeable lens 200 of this embodiment comprises the focusing lens 210b, the blurring correction lens 210c, and the iris diaphragm 211, all of which are driven members (optical members) whose driven states change. In the following explanation, the information related to the positions of these three driven members (optical members) will be termed the "driven information". Here, the positions of these driven members mean, for example: in the case of the focusing lens 210b, its position along the direction of the optical axis; in the case of the blurring correction lens 210c, its position in the plane perpendicular to the optical axis; and, in the case of the iris diaphragm 211, its opening state (i.e. the positions of its iris aperture vanes). Moreover, this information related to the positions of the driven members may also be considered as being information related to the driven states of the driven members. The driven information for the driven members is detected by the driven information detection processing executed by the lens control unit 203.

The lens control unit 203, for example, may detect the position of the focusing lens 210b by counting the number of pulses of a signal inputted to a drive system for the focusing lens 210b (such as a stepping motor or the like). Or, it would also be acceptable to arrange to detect the position of the focusing lens 210b by employing a per se known distance encoder or the like provided to the interchangeable lens 200. In a similar manner, the positions of the other driven members are also detected by per se known methods.

Figure 6A:
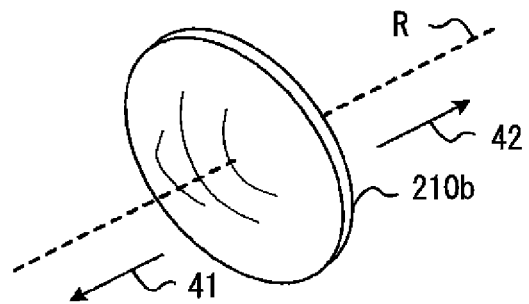
FIGS. 6A, 6B and 6C are schematic figures showing a driven member (an optical member), with FIG. 6A showing schematically a focusing lens, FIG. 6B showing schematically a blurring correction lens and FIG. 6C showing schematically an iris diaphragm.
Figure 6B:
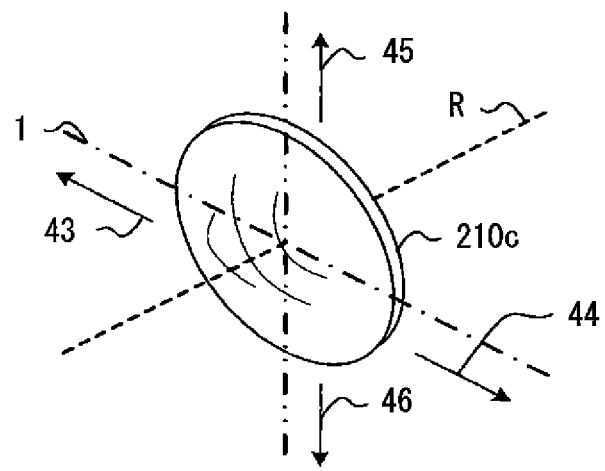
Figure 6C:
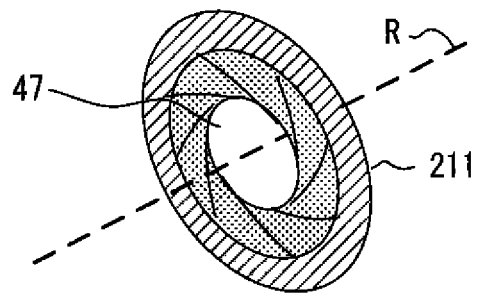

FIGS. 6A, 6B and 6C are schematic figures showing the driven members (optical members), and, in this figure, FIG. 6A schematically shows the focusing lens 210b, FIG. 6B schematically shows the blurring correction lens 210c, and FIG. 6C schematically shows the iris diaphragm 211. As shown in FIG. 6A, the focusing lens 210b is driven along the optical axis R. The lens control unit 203 detects the amount by which the focusing lens 210b is thus driven as being its driven information. This drive amount of the focusing lens 2101b is expressed as a two byte integer. This integer takes an integer value in the range from 65536 to +65535, and assumes either a positive value when the lens is driven in the direction of the arrow sign 41 (i.e. in the direction towards the photographic subject) or a negative value when the lens is driven in the direction of the arrow sign 42 (i.e. in the direction towards the camera body 100). This integer value that represents the drive amount of the focusing lens 210b is relative to the position of the focusing lens 210b after the previous processing of driven information detection processing was executed, which is taken as being zero. In other words, this integer value that is the driven information for the focusing lens 210b expresses the position of the focusing lens 210b in the form of its amount of displacement after the previous processing of detection processing.

The lens control unit 203 utilizes this drive amount of the focusing lens 210b when performing automatic focus adjustment. It should be understood that this automatic focus adjustment processing that is executed by the lens control unit 203 on the basis of change of the focused state of the focusing lens 210b and the drive amount of the focusing lens 210b is performed by a per se known technique, and accordingly explanation thereof will be omitted.

As shown in FIG. 6B, the blurring correction lens 210c is driven along the horizontal axis 42 orthogonal to the optical axis R and along the vertical axis 43. The lens control unit 203 detects the amounts through which the blurring correction lens 210c is driven as being its driven information. The drive amount of the blurring correction lens 210c is generated from two integer values each having a size of one byte, one of which (the horizontal drive amount) is the drive amount along the horizontal axis 42, and the other of which (the vertical drive amount) is the drive amount along the vertical axis 43. Each of these drive amounts is a value in the range from 128 to +127. The horizontal drive amount assumes either a positive value when the lens is driven in the direction of the arrow sign 42f or a negative value when the lens is driven in the direction of the arrow sign 42b. In a similar manner, the vertical drive amount assumes either a positive value when the lens is driven in the direction of the arrow sign 43f or a negative value when the lens is driven in the direction of the arrow sign 43b. In a similar manner to the case with the driven information for the focusing lens 210b, this driven information for the blurring correction lens 210c is also expressed as the amounts of displacement thereof after the previous processing of its driven information detection processing.

The drive amount of the blurring correction lens 210c is employed by the lens control unit 203 for performing automatic focus adjustment. Image blurring correction using the blurring correction lens 210c is performed by driving the blurring correction lens 210c on the basis of the amount of blurring of the interchangeable lens 200, and by thus changing the optical axis of the focusing optical system 210. In some cases, an influence may be exerted by this changing of the optical axis so that, for example, the focusing optical system, that was correctly focused, departs somewhat from the focused state, or the like. The lens control unit 203 utilizes the drive amount of the blurring control lens 210c in order to perform minute adjustment of the focused state in this type of case.

And FIG. 6C shows the iris diaphragm 211, this being disposed upon the optical axis R. This iris diaphragm 211 has an opening portion 47 that is defined by a plurality of iris aperture vanes. The lens control unit 203 detects the size of the opening portion 47 as being the driven information of the diaphragm. In a similar manner to the case with the other optical members, this driven information is also expressed as the amount of change of the opening size after the previous processing of driven information detection processing. This driven information is expressed as a two byte integer value that takes a value in the range from 65536 to +65535. This integer value expresses the amount of change of the iris aperture in terms of a number of steps, and assumes either a positive value when the iris aperture closes down or a negative value when the iris aperture opens up. This integer value is detected in resolving power steps of $1/12$; for example, if the iris aperture has closed down by just $1/12$ of a step from the previous detection processing, then the lens control unit detects an integer value of +1 as being the driven information for the iris diaphragm 211.

The body control unit 103 utilizes the drive amount of the iris diaphragm 211 in order to detect the state of the iris diaphragm 211. A time lag that depends upon the state of the interchangeable lens 200 elapses between when the body control unit 103 transmits a drive command for the iris diaphragm 211 to the lens control unit 211, and when actually the driving of the iris diaphragm 211 is completed. It is difficult to estimate this time lag accurately. Accordingly, in general, after having reliably completed the driving of the iris diaphragm by waiting after transmitting the drive command for just a time period that is considered to be sufficiently greater than this time lag, the body control unit 103 then executes the subsequent processing. On the other hand since, by obtaining the drive amount of the iris diaphragm 211, the body control unit 103 of this embodiment is able to detect the fact that the iris diaphragm has reliably closed down to the specified size, accordingly no extra waiting time period is required.

Explanation of Initialization Processing

The supply of electrical power to the interchangeable lens 200 starts when the interchangeable lens 200 is attached while the power supply of the camera body is in the ON state. At this time, the body control unit 103 and the lens control unit 203 start performing initialization processing for the interchangeable lens 200.

Figure 7A:
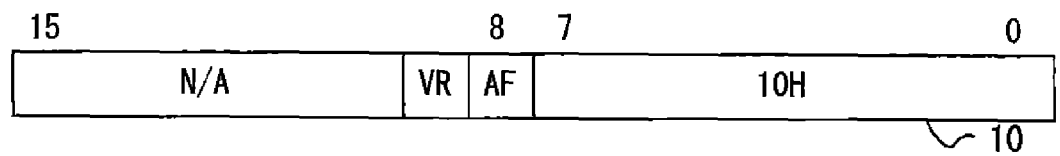
FIGS. 7A and 7B are figures showing an example of data transmitted and received by command data communication during initialization of an interchangeable lens 200, with FIG. 7A showing characteristic data being transmitted by a lens control unit and FIG. 7B showing type data being transmitted by the lens control unit.
Figure 7B:
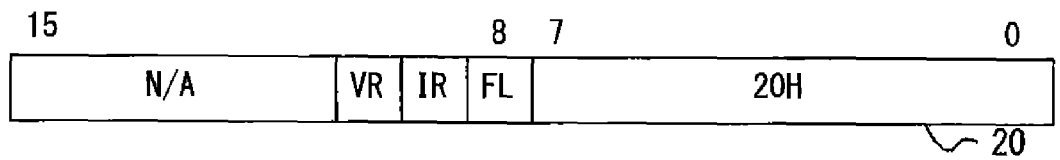

FIGS. 7A and 7B are figures showing an example of data transmitted and received by command data communication during initialization of the interchangeable lens 200. In this initialization processing, data of various types that is required for control of the interchangeable lens 200 is transmitted and received by command data communication.

During the initialization processing, the lens control unit 203 transmits characteristic data 10 shown in FIG. 7A to the body control unit 103. This characteristic data 10 is two bytes of data, of which the lower ranking byte is a specification value that specifies that this data is characteristic data. The body control unit 103 inspects the lower ranking byte of the data that has been received, and recognizes that this data is characteristic data. And the various bits of the higher ranking byte of the characteristic data 10 correspond to functions of various types with which the interchangeable lens 200 may be endowed. For example, in the example shown in FIG. 7A, the eighth bit (AF) of the characteristic data 10 corresponds to automatic focus adjustment, while its ninth bit (VR) corresponds to the image blurring correction function. If the value of either of these bits is 1, then this interchangeable lens 200 is endowed with the corresponding function. It should be understood that the bits in FIG. 7 where "N/A" is written are bits for which, in this embodiment, no meaning is prescribed. In other words, these bits may have any value.

Having transmitted the characteristic data 10, then the lens control unit 203 transmits type data shown in FIG. 7B to the body control unit 103. This type data 20 is two bytes of data specifying the types of driven information that the lens control unit 203 is capable of transmitting, and, in a similar manner to the case with the characteristic data 10, its lower ranking byte is a specification value that specifies that this data is type data. And the higher ranking byte of the type data 20 specifies the types of driven information that the interchangeable lens 200 is capable of transmitting by hot line communication. In concrete terms, each of the bits corresponds to one type of driven information that can be transmitted, and, if the value of any one of the bits is 1, this means that the lens control unit 203 is capable of transmitting the type of driven information that corresponds to that bit.

For example, in FIG. 7B, the eighth bit of the type data (FL) corresponds to the drive amount per unit time of the focusing lens 210b, the ninth bit (IR) corresponds to the drive amount per unit time of the iris diaphragm 211, and the tenth bit (VR) corresponds to the drive amount per unit time of the blurring correction lens 210c. By referring to the various bits of the type data 20 that has been received, the body control unit 103 is able to recognize what types of driven information can be transmitted by hot line communication. In the type data 20 that is transmitted from the interchangeable lens 200 of this embodiment, the bits for FL, IR, and VR are all equal to 1.

As described above, when the interchangeable lens 200 is attached to the camera body 100, the lens control unit 203 transmits the type data 20 that specifies the type of driven information that the lens control unit 203 is capable of transmitting.

Explanation of the Driven Information Detection Processing

After the end of the initialization processing, the body control unit 103 requests the lens control unit 203 to start performing hot line communication on the predetermined cycle. And, upon receipt of this hot line communication start request from the camera body 100, the lens control unit 203 executes driven information detection processing. This hot line communication start request consists of a change of the signal level on a specified signal line (i.e. the signal line HREQ), as previously described. Moreover, the driven information detection processing is processing to detect from the optical members (i.e. from the driven members) the driven information to be transmitted to the body control unit 103.

Explanation of the Driven Information Transmission Processing

Having executed the driven information detection processing, the lens control unit 203 next executes driven information transmission processing. In this transmission processing for the driven information, the various items of driven information that were detected by the driven information detection processing are transmitted to the body control unit 103 by the lens control unit 203.

Figure 8A:
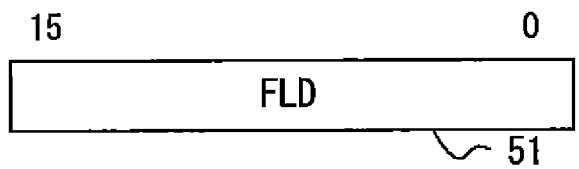
FIGS. 8A, 8B, 8C and 8D are figures showing a data format for driven information, with FIG. 8A showing FL data that specifies drive amount of the focus lens, FIG. 8B showing IR data that specifies drive amount of the iris diaphragm, FIG. 8C showing VR data that specifies drive amount of the blurring correction lens and FIG. 8D showing data for transmission.
Figure 8B:
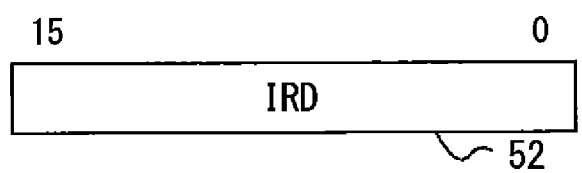
Figure 8C:
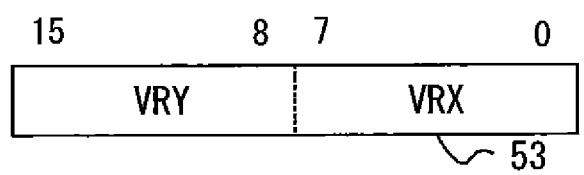

FIGS. 8A, 8B, 8C and 8D are figures showing the data format for the driven information. FL data 51 that specifies the drive amount of the focusing lens 210b, IR data 52 that specifies the drive amount of the iris diaphragm 211, and VR data 53 that specifies the drive amounts of the blurring correction lens 210c, are shown in FIGS. 8A through 8C respectively. Since, as previously described, the drive amount of the focusing lens 210b and the drive amount of the iris diaphragm 211 are both detected as two byte integer values, accordingly the FL data 51 and the IR data 52 are two bytes in size, as shown in FIGS. 8A and 8B.

Moreover, both the drive amount of the blurring correction lens 210c in the left and right direction and also its drive amount in the up and down direction are detected as one byte integer values. Corresponding to this, as shown in FIG. 8C, the VR data 53 is a data item consisting of two bytes, of which the lower ranking byte specifies the drive amount VRX in the left and right direction, while the upper ranking byte specifies the drive amount VRY in the up and down direction.

Figure 8D:
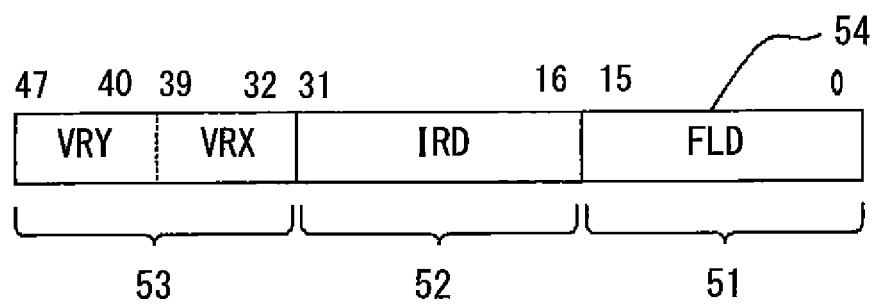

The lens control unit 203 links these data items shown in FIGS. 8A through 8C in a predetermined sequence, and thus generates the data for transmission to be transmitted to the body control unit 103 by hot line communication. The data for transmission 54 that has been generated in this manner is shown in FIG. 8D. The lens control unit 203 links the drive amount of the focusing lens 210b (i.e. the FL data 51), the drive amount of the iris diaphragm 211 (i.e. the IR data 52), and the drive amounts of the blurring correction lens (i.e. the VR data 53) in order from the lower ranking byte.

It should be understood that, if the interchangeable lens 200 does not contain any one of these driven members (optical members), i.e. the focusing lens 210b, the blurring correction lens 210c, and the iris diaphragm 211, then naturally the data for transmission that is generated by the lens control unit 203 does not include any driven information for that driven member. Moreover, if the interchangeable lens 200 further has some other driven member, then driven information for that driven member is further appended to the data for transmission generated by the lens control unit 203.

As described above, the lens control unit 203 repeatedly generates the driven information for the various driven members incorporated in the interchangeable lens 200 and transmits this information to the camera body 100 via the first transmission unit 301, according to the clock signal described above generated by the camera body 100.

With the camera system according to the first embodiment described above, the following beneficial operational effects are obtained. (1) The interchangeable lens 200 comprises the lens side mount unit 201 to which the camera body 100 can be attached, the focusing optical system 210 that includes the plurality of driven members whose driven state changes, the first lens side communication unit 217, and the second lens side communication unit 218. And the second lens side communication unit 218 transmits multiple items of driven information related to the position of each of the plurality of driven members via the second transmission path, according to the clock signal that is outputted from the camera body 100. Moreover, via the first transmission path, the first lens side communication unit 217 transmits the type data 20 specifying the type of driven information that can be transmitted by the second lens side communication unit 218. Since the above arrangements are made, the camera body 100 is able to ascertain the types of driven information that can be transmitted from the interchangeable lens 200. To put it in another manner, it is possible for the interchangeable lens 200 to notify in advance to the camera body 100 the types of the driven information that can subsequently be transmitted.

(2) The lens control unit 203 transmits the type data 20 when the interchangeable lens 200 is attached to the camera body 100. Since it is arranged for this to be done, accordingly, after the interchangeable lens 200 has been attached, the body control unit 103 is able to start acquisition of the driven information rapidly.

(3) The lens control unit 203 transmits the driven information via the second transmission path, this being specialized for transmission of the driven information. Since this arrangement is made, accordingly there is no decrease of the responsiveness in communication of the driven information due to congestion of communication upon the first transmission path or the like.

(4) The body control unit 103 requests hot line communication to be started, not by transmitting data specifying a communication request to the lens control unit 203, but rather by changing the signal level upon a specified signal line. Since it is arranged to do this, accordingly the driven information transmission request does not generate much communication.

(5) The lens control unit 203 transmits driven information of a plurality of types by hot line communication. Since it is arranged to do this, accordingly, even if for example the number of types of driven information has increased, still it is sufficient only to change the contents of the data that is transmitted, so that there is no requirement to add any signal line or encoder or the like, as was the case with the prior art.

Embodiment #2

The camera system according to the second embodiment to which the present invention has been applied has a similar structure to that of the camera system of the first embodiment, but the details of the initialization processing for the interchangeable lens 200 are different from those in the first embodiment. In the following, the points of difference between this camera system according to the second embodiment and the camera system of the first embodiment will be explained. It should be understood that, in the following explanation, to elements that are similar to ones in the first embodiment, the same reference symbols will be appended, and explanation thereof will be curtailed.

Figure 9A:
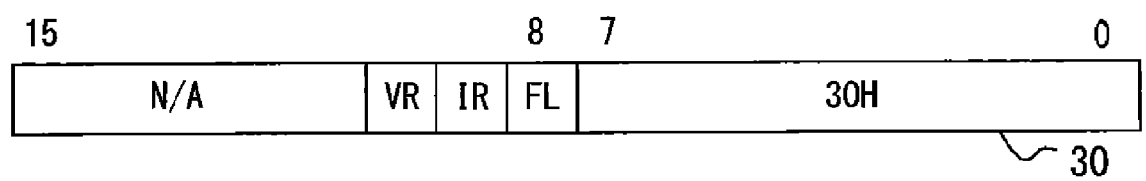
FIGS. 9A and 9B are figures showing various types of data transmitted and received in a second embodiment, with FIG. 9A showing specification data that is transmitted from the body control unit to the lens control unit during the initialization processing and FIG. 9B showing transmitted data that is transmitted by the lens control unit.
Figure 9B:
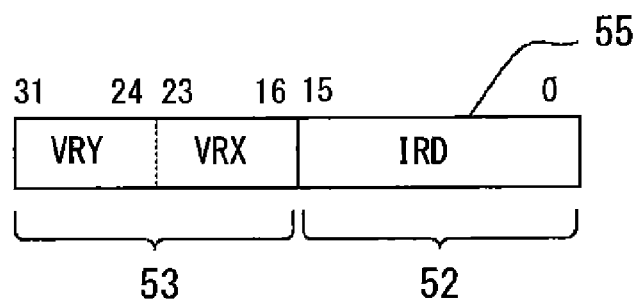

FIGS. 9A and 9B are figures showing various types of data transmitted and received in this second embodiment. FIG. 9A is a figure showing specification data that is transmitted from the body control unit 103 to the lens control unit 203 during the initialization processing. Upon receipt of the type data 20, for each of the various types of driven information that can be transmitted by the interchangeable lens 200, the body control unit 103 performs decision processing to decide whether or not the body control unit 103 needs the driven information of that type. And specification data 30 that specifies the types of driven information that have been decided by this decision processing to be necessary is transmitted to the lens control unit 203.

The specification data 30 is two byte data in this embodiment, and, in a similar manner to the case with the characteristic data 10 and the type data 20, the lower ranking one byte is an characteristic value that specifies that this is specification data. Moreover, the higher ranking one byte of the specification data 30 specifies the types of driven information to be transmitted by hot line communication from the interchangeable lens 200. In concrete terms, in a similar manner to the case with the type data 20, each bit corresponds to a type of driven information, and, if any one of the bits is 1, then the body control unit 103 is requesting the lens control unit to provide the driven information of the corresponding type.

In FIG. 9A, the eighth bit (FL) of the specification data 30 corresponds to the drive amount per unit time of the focusing lens 210b, the ninth bit (IR) corresponds to the drive amount per unit time of the iris diaphragm 211, and the tenth bit (VR) corresponds to the drive amount per unit time of the blurring correction lens 210c, respectively. For example, if the user sets the auto focus mode of the camera body 100, then the body control unit 103 needs to know the drive amount of the focusing lens 210b in order to perform automatic focus adjustment. Thus, in the decision processing described above, the body control unit 103 decides that the drive amount of the focusing lens 210b is required. And thus specification data 30 in which the eighth bit is 1 is transmitted to the interchangeable lens 200. On the other hand, if the camera body 100 is set to the manual focus mode, then the body control unit 103 does not perform automatic focus adjustment, and accordingly the drive amount of the focusing lens 210b is not required. Thus, the body control unit 103 transmits specification data 30 in which the eighth bit is 0 to the exchangeable lens 200.

In the decision processing, the body control unit 103 decides that driven information is not required in the following cases. For example, suppose that the interchangeable lens 200 is a new interchangeable lens that was manufactured more recently than the camera body 100, and that it is capable of transmitting driven information of a new type that was not envisaged by the camera body. In this case, it is decided that the driven information of this type is useless, because the camera body 100 does not have any method of utilizing driven information of that type. Moreover, if the camera body 100 is a low priced camera body that only has restricted functions, then there is a possibility that it is not equipped with high level control functions that can employ driven information of the specified type. In this type of case, driven information of that type is not required.

When the lens control unit 203 receives the specification data 30, it repeatedly transmits to the body control unit 103 driven information of the type(s) specified by that specification data. Now in some cases the lens control unit 203 may not be able to receive the specification data 30 correctly, due to various reasons such as, for example, the influence of electrical noise being experienced upon the signal line or the like. If, in this manner, it has not been possible for the specification data 30 to be received during the initialization processing, subsequently, in the hot line communication after the initialization processing, the lens control unit 203 of this embodiment transmits to the body control unit 103 driven information of all the types that it can transmit. It should be understood that "if it has not been possible for the specification data 30 to be received during the initialization processing" not only includes the case in which, although the body control unit 103 did transmit the specification data 103, the lens control unit 203 was not able to receive it, but also naturally includes the case in which the body control unit 103 did not transmit the specification data 30.

If the body control unit 103 transmits specification data from which a portion of the driven information (for example, the driven information for the focusing lens 210*b*) is excluded, and the lens control unit 203 has received this specification data 30 correctly, then, in the hot line communication, the lens control unit 203 transmits transmitted data 55 as, for example, shown in FIG. 9B. The FL data 51 is not included in this transmitted data 55, which accordingly is different from the transmitted data shown in FIG. 8D. On the other hand, if the lens control unit 203 has not received the specification data 30 correctly, then the lens control unit 203 transmits transmitted data 54 that includes all of the driven information (as in FIG. 8D, irrespective of the fact that the body control unit 103 has not requested such driven information. To put this in another manner, the lens control unit 203 transmits transmitted data 54 that has no particular relationship with the specification data 30 from the body control unit 103. After the body control unit 103 has received the transmitted data 54 of this type, it recognizes that the FL data 51 is present at its leading end, and simply ignores that FL data 51.

According to the camera system according to the second embodiment described above, the following beneficial operational effects are obtained. (1) Via the first transmission path, the lens control unit 203 receives from the camera body 100 the specification data 30 that specifies the type of driven information. And, if the lens control unit 203 has not succeeded in receiving the specification data 30, then it transmits driven information of all the types that it is capable of transmitting. To put this in another manner, the lens control unit 203 transmits transmitted data 54 that has no particular relationship with the specification data 30 from the body control unit 103. Since the above arrangement is provided, accordingly the camera body 100 is able to receive the driven information, even if a failure has occurred in the transmission of the specification data 30 that specifies the driven information.

The following variations also fall within the scope of the present invention; and, moreover, it would also be possible to combine one or a plurality of these variant embodiments with the embodiments described above.

Variant Embodiment #1

It would also be acceptable to arrange for two or more types of driven information to exist for a single driven member (optical member). For example while, in the first embodiment, the VR data 53 that specifies the drive amounts of the blurring correction lens 210 is generated from the horizontal drive amount VRX and the vertical drive amount VRY, it would also be acceptable to arrange to handle these two drive amounts as separate items of driven information. Furthermore, for a single driven member (optical member), it would also be acceptable for two or more items of driven information to exist whose classifications and methods of utilization are completely different. For example, in the first embodiment, apart from the FL data 51 that specifies the drive amount of the focusing lens 210*b*, it would also be acceptable to arrange for it to be possible to employ data specifying the drive speed of the focusing lens 210*b*.

Variant Embodiment #2

It may be arranged for the initialization processing to be executed according to any form of timing. For example, it would be possible for the initialization processing to be executed in response to attachment of the interchangeable lens 200 even when the camera body 100 is in the power OFF state, or for it to be executed only if the interchangeable lens 200 is attached when the power supply to the camera body 100 is on.

Variant Embodiment #3

The format for the driven information is not limited to the format explained in connection with the first embodiment. For example, the drive amounts for the various optical members could also be expressed as integer values specifying the absolute positions of those optical members; and they could also be specified in a representative format other than the two-byte integer format (for example, in floating point format). The same holds for the characteristic data 10, the type data 20, and the specification data 30.

Variant Embodiment #4

The way in which the various items of driven information are employed could also be different from that explained in connection with the first embodiment. For example, the drive amount of the focusing lens 210*b* could also be employed in processing other that automatic focus adjustment.

Variant Embodiment #5

It would also be acceptable to provide other driven members within the interchangeable lens 200, different from the focusing lens 210*b*, the blurring correction lens 210*c*, and the iris diaphragm 211. For example, a zoom lens like the focusing lens 2101) could be provided, this being a member that is shiftable along the direction of the optical axis of the interchangeable lens (i.e. of the focusing optical system 210), and a mechanism for driving this zoom lens electrically (i.e. a power zoom mechanism) could be provided internally to the interchangeable lens 200.

Variant Embodiment #6

It would also be acceptable to arrange for the lens control unit 203, when transmitting the transmitted data via hot line communication, not to transmit combinations of data of the same type upon every timing for transmission, without any relationship with the specification data 30 from the body control unit 103. For example, it would be possible to change the combination of data that is transmitted for each processing of transmission. In concrete terms, as one example, it would be possible to arrange to transmit "the position information of the focusing lens 210b" at the first transmission timing, to transmit "the position information of the focusing lens 210b, the position information of the blurring correction lens 210c, and the vane position information of the iris diaphragm 211" at the second transmission timing (as in the case of the transmitted data 54 described above), and to transmit "the position information of the blurring correction lens 210c and the shatter vane position information of the iris diaphragm 211" at the third transmission timing (as in the case of the transmitted data 55 described above), and subsequently to perform transmission repeatedly according to this sequence.

The present invention is not to be considered as being limited by the embodiments described above; provided that the essential characteristics of the present invention are preserved, other forms of implementation that are considered to lie within the range of the technical concept of the present invention are also included within its scope.

What is claimed is:

1. An interchangeable lens, comprising:
an attachment section to which a camera body is to be attached;
a photographic optical system that includes a plurality of driven members whose driven state is changeable;
a driven information transmission unit that transmits a plurality of items of driven information to the camera body according to a clock signal outputted from the camera body, the plurality of items of driven information being related to positions of the plurality of driven members;
a type information transmission unit that transmits type information via a first transmission unit which is provided with first contacts, the type information representing a type of driven information which can be transmitted by the driven information transmission unit; and
a specification information reception unit that receives specification information from the camera body via the first transmission unit, the specification information specifying the type of the driven information; wherein:
the driven information transmission unit transmits the driven information for each of the plurality of driven members via a second transmission unit which is provided with second contacts that are different from the first contacts; and
if the specification information reception unit does not succeed in receiving the specification information, the driven information transmission unit transmits the driven information of all the types that can be transmitted by the driven information transmission unit.

2. An interchangeable lens according to claim 1, wherein the plurality of driven members includes at least one of a focusing lens that performs focus adjustment of the photographic optical system, a blurring correction lens that corrects image blurring of an image of a photographic subject, and an iris aperture that adjusts an amount of light from the photographic subject that passes through the photographic optical system.

3. An interchangeable lens according to claim 1, wherein if the specification information reception unit succeeds in receiving the specification information, the driven information transmission unit transmits the driven information of the type specified by the specification information.

4. An interchangeable lens, comprising:
an attachment section to which a camera body is to be attached;
a photographic optical system that includes a plurality of driven members whose driven state is changeable;
a driven information transmission unit that transmits a plurality of items of driven information to the camera body according to a clock signal outputted from the camera body, the plurality of items of driven information being related to positions of the plurality of driven members;
a type information transmission unit that transmits type information via a first transmission unit which is provided with first contacts, the type information representing a type of driven information that can be transmitted by the driven information transmission unit; and
a specification information reception unit that receives specification information from the camera body via the first transmission unit, the specification information specifying the type of the driven information;
wherein the driven information transmission unit, without any relationship with the specification information, transmits the driven information for each of the plurality of driven members via a second transmission unit which is provided with second contacts that are different from the first contacts.

5. An interchangeable lens according to claim 4, wherein if the specification information reception unit does not succeed in receiving the specification information, the driven information transmission unit transmits the driven information of all the types that can be transmitted.

6. An interchangeable lens, comprising:
an attachment section to which a camera body is to be attached;
a photographic optical system that includes a plurality of driven members whose driven state is changeable;
a driven information transmission unit that transmits a plurality of items of driven information to the camera body, the plurality of items of driven information being related to positions of the plurality of driven members;
a type information transmission unit that transmits type information via a first transmission unit which is provided with first contacts, the type information representing a type of driven information which can be transmitted by the driven information transmission unit; and
a specification information reception unit that receives specification information from the camera body via the first transmission unit, the specification information specifying the type of the driven information; wherein
the driven information transmission unit transmits the driven information for each of the plurality of driven members via a second transmission unit which is provided with second contacts that are different from the first contacts; and
if the specification information reception unit does not succeed in receiving the specification information, the driven information transmission unit transmits the driven information of all the types that can be transmitted by the driven information transmission unit.

7. An interchangeable lens according to claim 6, wherein the plurality of driven members includes at least one of a focusing lens that performs focus adjustment of the photographic optical system, a blurring correction lens that corrects image blurring of an image of a photographic subject, and an iris aperture that adjusts an amount of light from the photographic subject that passes through the photographic optical system.

8. An interchangeable lens according to claim 6, wherein if the specification information reception unit succeeds in receiving the specification information, the driven information transmission unit transmits the driven information of the type specified by the specification information.

9. An interchangeable lens, comprising:
an attachment section to which a camera body is to be attached;
a photographic optical system that includes a plurality of driven members whose driven state is changeable;
a driven information transmission unit that transmits a plurality of items of driven information to the camera body, the plurality of items of driven information being related to positions of the plurality of driven members;
a type information transmission unit that transmits type information via a first transmission unit which is provided with first contacts, the type information representing a type of driven information that can be transmitted by the driven information transmission unit; and
a specification information reception unit that receives specification information from the camera body via the first transmission unit, the specification information specifying the type of the driven information;
wherein the driven information transmission unit, without any relationship with the specification information, transmits the driven information for each of the plurality of driven members via a second transmission unit which is provided with second contacts that are different from the first contacts.

10. An interchangeable lens according to claim 9, wherein if the specification information reception unit does not succeed in receiving the specification information, the driven information transmission unit transmits the driven information of all the types that can be transmitted.

11. A device, comprising:
an attachment section to which a camera body is to be attached;
a plurality of driven members whose driven state is changeable;
a driven information transmission unit that transmits a plurality of items of driven information to the camera body, the plurality of items of driven information being related to positions of the plurality of driven members;
a type information transmission unit that transmits type information via a first transmission unit which is provided with first contacts, the type information representing a type of driven information which can be transmitted by the driven information transmission unit; and
a specification information reception unit that receives specification information from the camera body via the first transmission unit, the specification information specifying the type of the driven information; wherein
the driven information transmission unit transmits the driven information for each of the plurality of driven members via a second transmission unit which is provided with second contacts that are different from the first contacts; and
if the specification information reception unit does not succeed in receiving the specification information, the driven information transmission unit transmits the driven information of all the types that can be transmitted by the driven information transmission unit.

12. A device according to claim 11, wherein
the plurality of driven members includes at least one of a focusing lens that performs focus adjustment of the photographic optical system, a blurring correction lens that corrects image blurring of an image of a photographic subject, and an iris aperture that adjusts an amount of light from the photographic subject that passes through the photographic optical system.

13. A device according to claim 11, wherein if the specification information reception unit succeeds in receiving the specification information, the driven information transmission unit transmits the driven information of the type specified by the specification information.

14. A device, comprising:
an attachment section to which a camera body is to be attached;
a plurality of driven members whose driven state is changeable;
a driven information transmission unit that transmits a plurality of items of driven information to the camera body, the plurality of items of driven information being related to positions of the plurality of driven members;
a type information transmission unit that transmits type information via a first transmission unit which is provided with first contacts, the type information representing a type of driven information that can be transmitted by the driven information transmission unit; and
a specification information reception unit that receives specification information from the camera body via the first transmission unit, the specification information specifying the type of the driven information;
wherein the driven information transmission unit, without any relationship with the specification information, transmits the driven information for each of the plurality of driven members via a second transmission unit which is provided with second contacts that are different from the first contacts.

15. A device according to claim 14, wherein if the specification information reception unit does not succeed in receiving the specification information, the driven information transmission unit transmits the driven information of all the types that can be transmitted.

* * * * *